US012688830B2

(12) United States Patent
Lee et al.

(10) Patent No.: US 12,688,830 B2
(45) Date of Patent: Jul. 21, 2026

(54) DISPLAY DRIVING CIRCUIT WITH VARYING BIAS VOLTAGE AND DISPLAY DEVICE INCLUDING THE SAME

(71) Applicant: SAMSUNG ELECTRONICS CO., LTD., Suwon-si (KR)

(72) Inventors: Sewan Lee, Suwon-si (KR); Soochan Kwon, Suwon-si (KR); Euihyuk Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/934,788

(22) Filed: Nov. 1, 2024

(65) Prior Publication Data

US 2025/0279059 A1 Sep. 4, 2025

(30) Foreign Application Priority Data

Feb. 29, 2024 (KR) ........................ 10-2024-0029823

(51) Int. Cl.
*G09G 3/3258* (2016.01)

(52) U.S. Cl.
CPC ... *G09G 3/3258* (2013.01); *G09G 2300/0842* (2013.01); *G09G 2310/08* (2013.01); *G09G 2320/0233* (2013.01); *G09G 2320/0673* (2013.01); *G09G 2330/021* (2013.01)

(58) Field of Classification Search
CPC ......... G09G 3/3258; G09G 2300/0842; G09G 2310/08; G09G 2320/0233; G09G 2320/0673; G09G 2330/021
See application file for complete search history.

(56) References Cited

U.S. PATENT DOCUMENTS

| | | | | |
|---|---|---|---|---|
| 9,275,606 | B2 | 3/2016 | Lee et al. | |
| 11,062,649 | B2 | 7/2021 | Kim et al. | |
| 11,373,572 | B2 | 6/2022 | Lee | |
| 11,393,398 | B2 | 7/2022 | Lee | |
| 11,580,906 | B2 * | 2/2023 | Wang | G09G 3/3233 |
| 11,651,736 | B2 | 5/2023 | Lin et al. | |
| 11,756,482 | B2 | 9/2023 | Han | |
| 11,783,774 | B2 | 10/2023 | Song et al. | |
| 2018/0191358 | A1 * | 7/2018 | Wang | H04L 7/033 |
| 2020/0211457 | A1 | 7/2020 | Kim et al. | |
| 2021/0256909 | A1 | 8/2021 | Lee | |
| 2021/0312848 | A1 | 10/2021 | Lee | |
| 2022/0180812 | A1 | 6/2022 | Lin et al. | |
| 2023/0143180 | A1 | 5/2023 | Song et al. | |
| 2023/0145805 | A1 * | 5/2023 | Kim | G09G 3/3233 345/691 |
| 2023/0196998 | A1 | 6/2023 | Han | |

* cited by examiner

*Primary Examiner* — Kwang-Su Yang
(74) *Attorney, Agent, or Firm* — Sughrue Mion, PLLC

(57) ABSTRACT

A display driving circuit includes a data driver that outputs a data signal to pixels, and a power supply that generates a driving voltage and a bias voltage. The driving voltage is provided to a first end of a transistor that generates a driving current based on the data signal provided to each of the pixels, and the bias voltage is provided at a second end of the transistor and varies based on a change in the driving voltage.

20 Claims, 12 Drawing Sheets

10

700

1000

1100

DISPLAY DRIVING CIRCUIT WITH VARYING BIAS VOLTAGE AND DISPLAY DEVICE INCLUDING THE SAME

This application claims priority from Korean Patent Application No. 10-2024-0029823 filed on Feb. 29, 2024, in the Korean Intellectual Property Office, the entire contents of which being incorporated herein by reference.

BACKGROUND

In general, a display device such as a light emitting display (LED) device, a quantum dot display (QDD) device, a liquid crystal display (LCD) device, or the like includes a display panel including a plurality of pixels for providing various visual information to a user, a driving portion that outputs a driving signal driving the display panel, a power supply portion that generates a power supply voltage to be supplied to the display panel or the driving portion, and the like. The display device may supply driving signals (for example, a scan signal, a data signal, and the like) to the plurality of pixels formed at the display panel, and may display an image by transmitting light or directly emitting light through a selected pixel.

On the other hand, as a driving condition of the display device changes, the power supply voltage provided to the display panel may also change.

SUMMARY

It is an aspect to provide a display driving circuit (or a display driving integrated circuit) that generates a bias voltage for controlling a hysteresis characteristic of a driving transistor within a pixel and a display device including the same.

It is another aspect to provide a display driving circuit that generates a bias voltage that varies as a driving condition changes and a display device including the same.

It is yet another aspect to provide a display driving circuit that controls a bias voltage and a display device including the same.

According to an aspect of one or more embodiments, there is provided a display driving circuit comprising a data driver that outputs a data signal to a plurality of pixels; and a power supply that generates a driving voltage and a bias voltage. The driving voltage is provided to a first end of a transistor that generates a driving current based on the data signal provided to each of the plurality of pixels, and the bias voltage is provided at a second end of the transistor and varies based on a change in the driving voltage.

According to another aspect of one or more embodiments, there is provided display device comprising a display panel that includes a plurality of pixels, each pixel including a light emitting element, a first transistor providing a driving current to the light emitting element based on a driving voltage applied to a first end thereof and a data voltage applied to a gate thereof, and a second transistor providing a bias voltage to a second end of the first transistor, the bias voltage varying a threshold voltage of the first transistor; a timing controller that outputs a control signal to the display panel to display an image at a first frame frequency and a second frame frequency; and a bias voltage generator that varies the bias voltage based on the control signal.

According to yet another aspect of one or more embodiments, there is provided a display driving circuit comprising a timing controller that outputs a control signal indicating a driving mode of a display panel including a plurality of pixels; and a bias voltage generator that outputs a bias voltage that controls a luminance deviation between frames of the plurality of pixels, wherein the bias voltage generator receives a reference voltage and a first voltage, generates a first output voltage with a specific level based on the reference voltage, generates a second output voltage based on the reference voltage and the first voltage, the second output voltage varying according to a change in a driving voltage of the plurality of pixels, and outputs the first output voltage as the bias voltage when the control signal indicates a high frequency driving mode and outputs the second output voltage as the bias voltage when the control signal indicates a low frequency driving mode.

DETAILED DESCRIPTION

Figure 1:
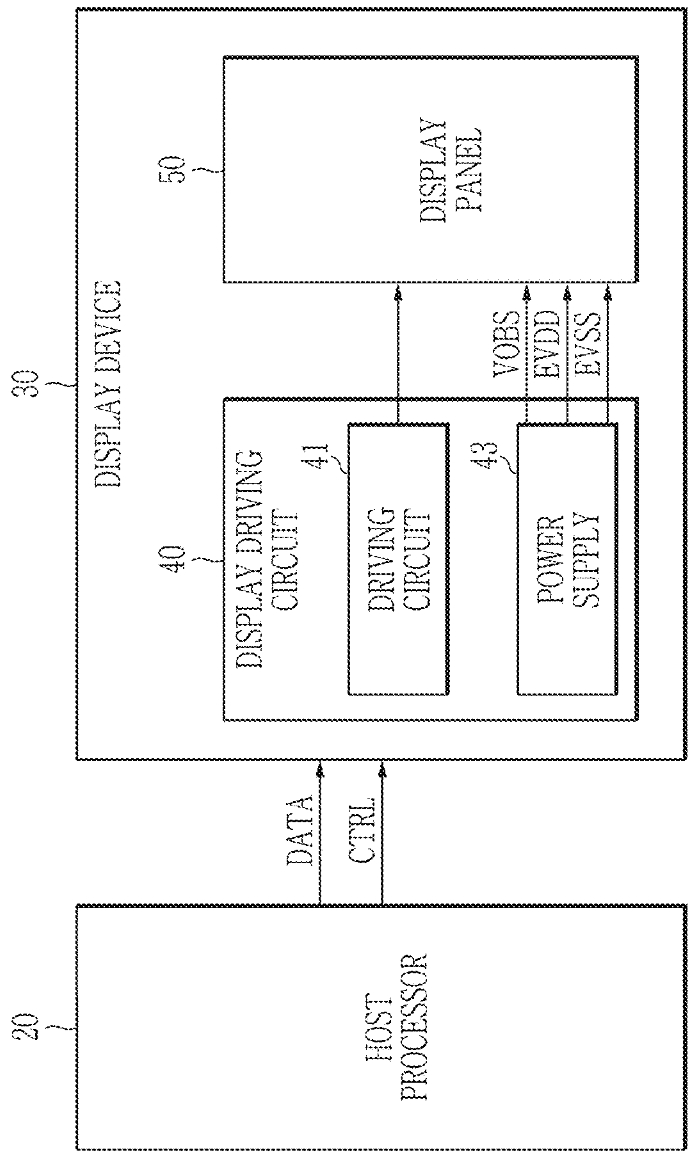
FIG. 1 is an example block diagram of a display system according to an embodiment.

Various embodiments will be described more fully hereinafter with reference to the accompanying drawings so that those skilled in the art easily implement the embodiments. The various embodiments may be modified in various different ways, all without departing from the spirit or scope of the present disclosure.

In order to clearly describe the various embodiments, parts or portions that are irrelevant to the description are omitted, and identical or similar constituent elements throughout the specification are denoted by the same reference numerals. In a flowchart described with reference to the drawings, an order of operations may be changed, several operations may be merged, a certain operation may be divided, and a specific operation may not be performed.

In addition, a singular form may be intended to include a plural form as well, unless an explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

FIG. 1 is an example block diagram of a display system according to an embodiment.

Referring to FIG. 1, a display system 10 may be mounted on an electronic device having an image display function. For example, the electronic device may include a smartphone, a tablet personal computer, a portable multimedia player (PMP), a camera, a wearable device, a television, a Digital Video Disk (DVD) player, a refrigerator, an air conditioner, an air purifier, a set-top box, a robot, a drone, various medical devices, a navigation device, a global positioning system (GPS) receiver, a vehicle device, a furniture, various measuring devices, or the like.

In an embodiment, the display system 10 may provide an artificial reality system such as a virtual reality (VR) system, an augmented reality (AR) system, a mixed reality (MR) system, a hybrid reality system, or some combination and/or a derivative system thereof. The artificial reality system may be implemented on various platforms including a head mounted display (HMD), a mobile device, a computing system, or other hardware platforms capable of providing an artificial reality content to one or more viewers.

The display system 10 may include a host processor 20 and a display device 30. The display device 30 may include a display driving circuit (or a display driving integrated circuit) 40 and a display panel 50.

The host processor 20 may generate an input image signal DATA to be displayed on the display panel 50, and may transmit the input image signal DATA and a control command CTRL to the display driving circuit 40. The input image signal DATA may include frame data corresponding to each frame. The control command CTRL may include setting information on luminance, gamma, a frame frequency, or the like.

In an embodiment, the host processor 20 may be a graphics processor. However, the embodiments are not limited thereto, and in some embodiments, the host processor 20 may be implemented with various types of processors such as a central processing unit (CPU), a microprocessor, a multimedia processor, an application processor (AP), an electronic control unit (ECU), or the like. In an embodiment, the host processor 20 may be implemented as an integrated circuit (IC) or a system on chip (SoC).

The display device 30 may receive the input image signal DATA from the host processor 20, and may display an image based on the input image signal DATA. The display device 30 may display a 2-dimensional or 3-dimensional image to a user. In an embodiment, the display device 30 may be a device in which the display driving circuit 40 and the display panel 50 are implemented as a single module. For example, the display driving circuit 40 may be installed on a substrate of the display panel 50, or the display driving circuit 40 and the display panel 50 may be electrically connected through a connection member such as a flexible printed circuit board (FPCB) or the like.

The display panel 50 may include a plurality of pixels. The display panel 50 may be a display device that receives an electrically transferred image signal to display a two-dimensional image such as a thin film transistor liquid crystal display (TFT-LCD), an organic light emitting diode (OLED) display, a field emission display, a plasma display panel (PDP), or the like. In an embodiment, there may be one or a plurality of display panels 50. For example, two display panels 50 may provide an image for each of the user's eyes.

The display driving circuit 40 may generate a plurality of analog signals for driving the display panel 50. For example, a driving circuit 41 within the display driving circuit 40 may provide a gate signal and a data signal for driving the plurality of pixels included in the display panel 50 as a plurality of analog signals. The driving circuit 41 may include a scan driver, a data driver, and the like. The display panel 50 may emit image light corresponding to the signal by the signal provided by the display driving circuit 40.

The display driving circuit 40 may provide a driving voltage for driving the plurality of pixels within the display panel 50. Specifically, a power supply 43 within the display driving circuit 40 may provide a first pixel driving voltage EVDD and a second pixel driving voltage EVSS for driving the plurality of pixels. In an embodiment, the second pixel driving voltage EVSS may be a ground voltage. However, embodiments are not limited thereto and, in some embodiments, the second pixel driving voltage EVSS may be a voltage lower than the first pixel driving voltage EVDD. The power supply 43 may provide a bias voltage VOBS to the plurality of pixels. The bias voltage VOBS may be a voltage for controlling luminance deviation of the plurality of pixels. For example, the bias voltage VOBS may be a voltage for minimizing the luminance deviation of the plurality of pixels. In an embodiment, the bias voltage VOBS may vary depending on a change in the first pixel driving voltage EVDD. In an embodiment, the bias voltage VOBS may vary depending on a change in the second pixel driving voltage EVSS.

Figure 2:
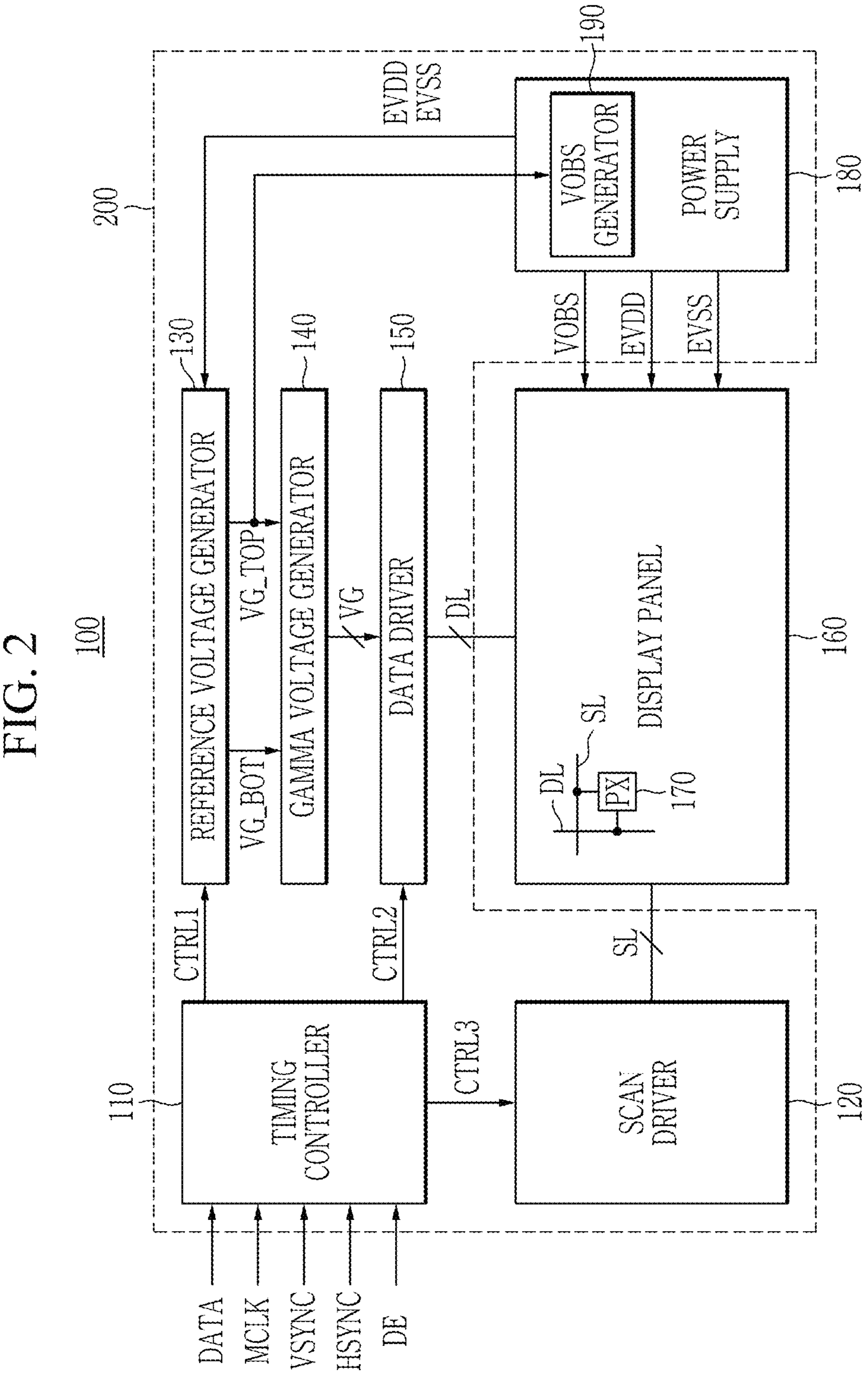
FIG. 2 is a schematic block diagram of a display device according to an embodiment.

FIG. 2 is a schematic block diagram of a display device according to an embodiment.

Referring to FIG. 2, a display device 100 may include a display panel 160, and a display driving circuit 200 including a timing controller 110, a scan driver 120, a reference voltage generator 130, a gamma voltage generator 140, a data driver 150, a power supply 180. The power supply 180 may be an electric power supply. In an embodiment, the display device 100 may be an example of the display device 30 of FIG. 1. In an embodiment, as shown in FIG. 2, the reference voltage generator 130 and the gamma voltage generator 140 may be independently implemented outside the data driver 150. In some embodiments, the reference voltage generator 130 and the gamma voltage generator 140 may be implemented inside the data driver 150. In some embodiments, the reference voltage generator 130 may be implemented inside the power supply 180.

The timing controller 110 may receive an input image signal DATA and an input control signal for controlling display of the input image signal DATA from an image source such as an external graphic device.

The input image signal DATA may include luminance information of each of a plurality of pixels (PX) 170 of the display panel 160, and the luminance may have a number (e.g., $1024=2^{10}$, $256=2^{8}$, or $64=2^{6}$) of grays. The number may be predetermined. The input control signal may include a main clock signal MCLK, a vertical synchronization signal VSYNC, a horizontal synchronization signal HSYNC, and a data enable signal DE. The display panel 160 may receive a scan signal from the scan driver 120 through a plurality of scan lines SL to display an image. The scan signal may be a combination of a scan-on voltage turning on application of a data signal to the pixel 170 and a scan-off voltage turning off the application of the data signal. The vertical synchronization signal VSYNC may indicate a start section in which the scan-on voltage is applied in one frame of the image, and the horizontal synchronization signal HSYNC may indicate a start section in which the scan-on voltage is applied in one scan line SL of the display panel 160. One cycle (or one period) of the vertical synchronization signal VSYNC may be a 1-frame period. One cycle of the horizontal synchronization signal HSYNC and the data enable signal DE is a 1-horizontal period (1H).

The timing controller 110 may generate control signals CTRL1, CTRL2, and CTRL3 based on the input image signal DATA and the input control signal. The timing controller 110 may control the reference voltage generator 130, the data driver 150, and the scan driver 120 using the control signals CTRL1, CTRL2, and CTRL3, respectively. In an embodiment, the timing controller 110 may further generate various control signals to drive the display device 100, and may control other components within the display device 100 based on the control signals. For example, in some embodiments, the timing controller 110 may control a bias voltage (VOBS) generator 190 by generating the control signal used for the bias voltage generator 190 to output a bias voltage VOBS. For example, in an embodiment, the timing controller 110 may output the control signal for controlling the bias voltage generator 190 according to a driving frequency of the display device 100.

The reference voltage generator 130 may receive the control signal CTRL1 from the timing controller 110. The reference voltage generator 130 may generate a maximum gamma voltage VG_TOP and a minimum gamma voltage VG_BOT based on the control signal CTRL1. For example, the reference voltage generator 130 may include a resistance string, a decoder, a gamma amplifier, and the like, and may generate the maximum gamma voltage VG_TOP and the minimum gamma voltage VG_BOT. The maximum gamma voltage VG_TOP and the minimum gamma voltage VG_BOT may be voltages used to generate a plurality of gamma voltages VG that determine luminance of each pixel of the display panel 160. For example, the maximum gamma voltage VG_TOP may be a maximum voltage that the plurality of gamma voltages VG may have, the minimum gamma voltage VG_BOT may be a minimum voltage that the plurality of gamma voltages VG may have, and each of the maximum and minimum gamma voltages VG_TOP and VG_BOT may be set based on a driving voltage (or a power supply voltage) applied to the reference voltage generator 130.

In an embodiment, the reference voltage generator 130 may receive a first pixel driving voltage EVDD and a second pixel driving voltage EVSS from the power supply 180. In an embodiment, the reference voltage generator 130 may determine the maximum gamma voltage VG_TOP as the first pixel driving voltage EVDD based on the control signal CTRL1, and may determine the minimum gamma voltage VG_BOT as the second pixel driving voltage EVSS based on the control signal CTRL1. In some embodiments, based on the control signal CTRL1, the reference voltage generator 130 may determine that levels of the maximum gamma voltage VG_TOP and the minimum gamma voltage VG_BOT are varied as levels of the first pixel driving voltage EVDD and the second pixel driving voltage EVSS are varied. The reference voltage generator 130 may transfer the maximum gamma voltage VG_TOP and the minimum gamma voltage VG_BOT to the gamma voltage generator 140. For example, the reference voltage generator 130 may output the maximum gamma voltage VG_TOP to one input end of the gamma voltage generator 140, and may output the minimum gamma voltage VG_BOT to the other input end of the gamma voltage generator 140.

Based on the maximum gamma voltage VG_TOP and the minimum gamma voltage VG_BOT, the gamma voltage generator 140 may generate the plurality of gamma voltages VG for a plurality of grays to output the generated voltages to the data driver 150. For example, the gamma voltage generator 140 may generate the plurality of gamma voltages VG by dividing a voltage between the maximum gamma voltage VG_TOP and the minimum gamma voltage VG_BOT. The maximum gamma voltage VG_TOP may be the highest voltage among the plurality of gamma voltages VG, and the minimum gamma voltage VG_BOT may be the lowest voltage among the plurality of gamma voltages VG. According to an embodiment, the plurality of gamma voltages VG may not include the maximum gamma voltage VG_TOP and the minimum gamma voltage VG_BOT.

In an embodiment, the timing controller 110 may output the control signal CTRL2 to the data driver 150 based on the input image signal DATA. The control signal CTRL2 may include image data suitable for an operation condition of the display panel 160.

The data driver 150 may generate a data signal for the image data using the plurality of gamma voltages VG according to the control signal CTRL2, and may provide the data signal to the display panel 160 through a plurality of data lines DL. The data driver 150 may include a decoder and a source amplifier to generate the data signal from the plurality of gamma voltages VG.

The display panel 160 may receive the first pixel driving voltage EVDD and the second pixel driving voltage EVSS from the power supply 180 to display an image according to a plurality of data signals. The first pixel driving voltage EVDD and the second pixel driving voltage EVSS may be voltages for driving the plurality of pixels 170. The first pixel driving voltage EVDD may be higher than the second pixel driving voltage EVSS. The display panel 160 may further receive the bias voltage VOBS from the bias voltage generator 190 within the power supply 180. The bias voltage VOBS may be a voltage applied to the pixel 170 to minimize a change in luminance of the pixel 170.

In an embodiment, the bias voltage generator 190 may output the bias voltage VOBS. The bias voltage VOBS may correspond to a variation value of the first pixel driving voltage EVDD. For example, the bias voltage generator 190 may receive a voltage (for example, the maximum gamma voltage VG_TOP) that varies according to a change in the first pixel driving voltage EVDD, and may change a voltage level of the bias voltage VOBS based on the voltage. In an embodiment, the bias voltage generator 190 may selectively output a voltage that changes according to the change in the first pixel driving voltage EVDD or a fixed voltage regardless of the change in the first pixel driving voltage EVDD as the bias voltage VOBS. For example, based on the control signal received from the timing controller 110, the bias voltage generator 190 may output the voltage that changes according to the change in the first pixel driving voltage EVDD and the driving frequency of the display device 100 or the fixed voltage regardless of the change in the first pixel driving voltage EVDD as the bias voltage VOBS. In various embodiments, the bias voltage generator may be disposed inside the power supply 180, or may be independently implemented outside the power supply 180.

The display panel 160 may include the plurality of pixels 170. The display panel 160 may be connected to the scan driver 120 through the plurality of scan lines SL, and may be connected to the data driver 150 through the plurality of data lines DL. The scan driver 120 may provide the scan signal to the display panel 160 through the plurality of scan lines SL according to the control signal CTRL3. The scan signal may be a combination of the scan-on voltage and the scan-off voltage. The control signal CTRL3 may include a scan start signal, a clock signal, and the like. The scan start signal may be a signal that generates a first scan signal for displaying an image of one frame. The clock signal may be a synchronization signal for sequentially applying the scan signal to the plurality of scan lines SL.

According to an embodiment, the display device 100 may further include a light emitting driver that outputs a light emission control signal (EM) for controlling light emitting of the plurality of pixels 170 within the display panel 160.

Figure 3:
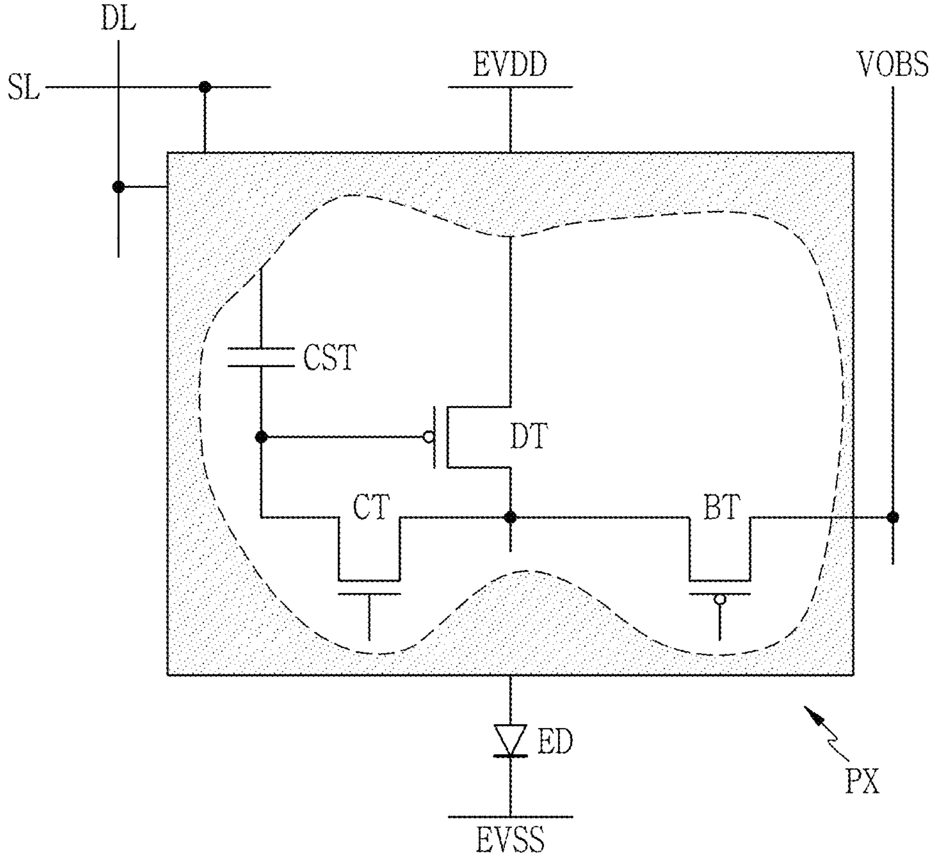
FIG. 3 is a schematic circuit diagram of a pixel of the display device according to an embodiment.

FIG. 3 is a schematic circuit diagram of the pixel of the display device according to an embodiment.

Referring to FIG. 3, in an embodiment, one pixel PX may be connected to the data line DL, the scan line SL, a first pixel driving voltage (EVDD) line, and a second pixel driving voltage (EVSS) line, and may include a capacitor CST, a driving transistor DT, a compensation transistor CT, a bias transistor BT, and the like. In some embodiments, the pixel PX may further include a compensation circuit that compensates for deterioration of a light emitting element ED such as an organic light emitting diode that emits light and deterioration of the driving transistor DT that supplies a driving current required for driving the light emitting element ED. However, for convenience of description, only some components of the pixel PX are shown in FIG. 3.

In an embodiment, the compensation transistor CT may be an oxide transistor including an oxide semiconductor layer. In an embodiment, the driving transistor DT and the bias transistor BT may be implemented as a P-type transistor, and the compensation transistor CT may be implemented as an N-type transistor, but the embodiments are not limited thereto. The capacitor CST may store a data voltage (Vdata) as a data signal corresponding to the input image signal DATA, and may apply the stored data voltage to a gate electrode of the driving transistor DT. Based on the data voltage (Vdata) applied from the capacitor CST, the driving transistor DT may generate the driving current required for driving the light emitting element ED using the first pixel driving voltage EVDD. In an embodiment, the light emitting element ED may be a self-luminous element capable of emitting light by itself such as an organic light emitting diode (OLED), a light emitting diode (LED), or the like.

In an embodiment, the compensation transistor CT may electrically connect a gate terminal and a first terminal (for example, a source terminal) of the driving transistor DT to compensate for a threshold voltage (Vth) of the driving transistor DT. For example, if the gate terminal and the source terminal of the driving transistor DT are connected by the compensation transistor CT and the data voltage (Vdata) is supplied to the driving transistor DT, a gate-source voltage (Vgs) of the driving transistor DT may increase to a difference voltage between the data voltage (Vdata) and the threshold voltage (Vth) of the driving transistor DT. Accordingly, the threshold voltage (Vth) of the driving transistor DT may be compensated. The bias transistor BT may apply the bias voltage VOBS to the driving transistor DT to minimize luminance deviation between frames.

In an embodiment, the display device 100 of FIG. 2 may be driven while varying the driving frequency. Specifically, in the display device 100, the timing controller 110 may adjust a way in which the display device 100 is driven by adjusting a refresh rate through a refresh rate control signal. For example, the display device 100 may be driven at the refresh rate that is higher or lower than a reference refresh rate. Particularly, driving the display device 100 at a lower rate than the reference refresh rate is referred to as a low-speed driving (also referred to as a low refresh rate driving), and driving the display device 100 at a higher rate than the reference refresh rate is referred to as a high-speed driving.

The low-speed driving denotes driving at a refresh rate lower than the reference refresh rate of 60 Hz, and denotes driving the display device 100 to output fewer frames than 60 frames per second. For example, the low-speed driving may have a refresh rate of 1 Hz, and the 1 Hz low-speed driving may output only one data per second.

Hereinafter, referring to FIG. 4, the low-speed driving of the display device 100 will be described in detail.

Figure 4:
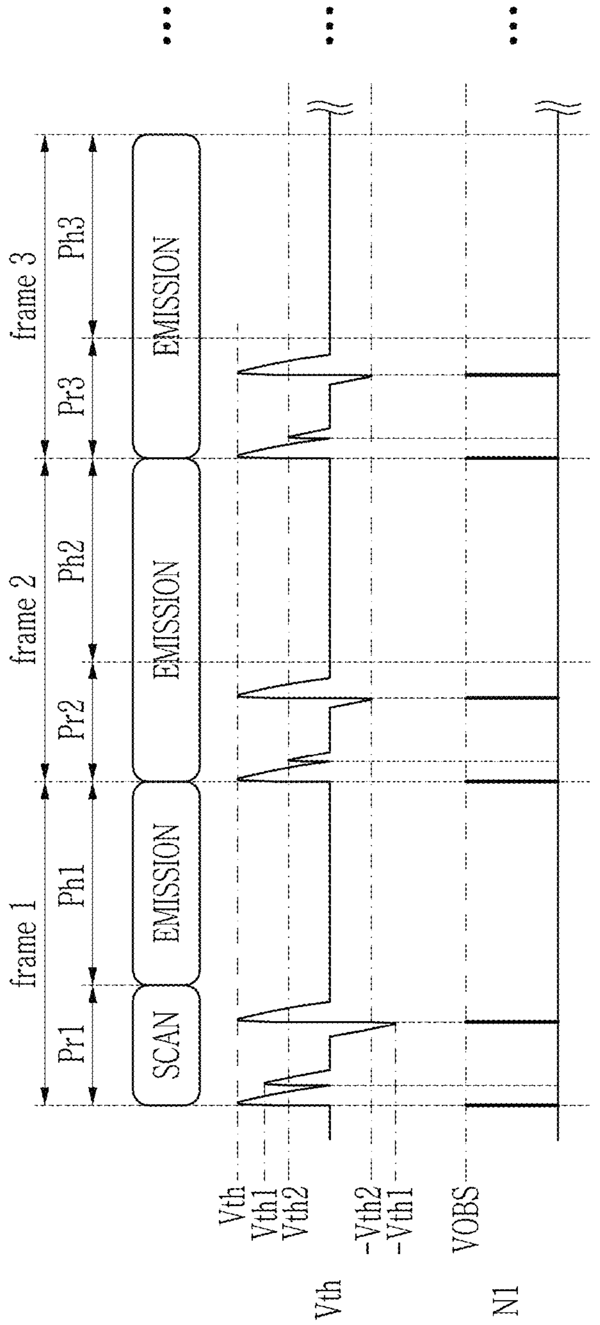
FIG. 4 is a view for describing a low speed driving mode of the display device according to an embodiment.

FIG. 4 is a view for describing a low speed driving mode of the display device according to an embodiment.

In a driving mode of the display device, each section may include a refresh section Pr and a horizontal holding section Ph. In an embodiment, each section may be one frame period. For example, in an embodiment, a first frame frame1 may include a first refresh section Pr1 and a first horizontal holding section Ph1, a second frame frame2 may include a second refresh section Pr2 and a second horizontal holding section Ph2, and a third frame frame3 may include a third refresh section Pr3 and a third horizontal holding section Ph3, and so on. Specifically, one frame may include a scan section in which a voltage charged or remaining in the capacitor CST and the driving transistor DT is initialized, the data voltage (Vdata) is received, and a characteristic value (the threshold voltage) of the driving transistor DT is compensated, and an emission section (or a light emission section) in which light emitting elements ED emit light. The refresh section Pr may include the scan section, and the horizontal holding section Ph may include the emission section in which the data voltage (Vdata) is not supplied through the data lines DL of the pixel PX and the light emitting elements ED emit light based on a driving current flowing by the driving transistor DT connected to each of the light emitting elements ED.

Referring to FIG. 4. in order to reduce electric power consumption of the display device, in the low speed driving mode with the refresh rate of 1 Hz, the display device may output image data input in the first frame frame 1 during a plurality of frames. Specifically, the light emitting devices ED may emit light during the first horizontal holding section Ph1 based on the data voltage (Vdata) received during the first refresh section Pr1. In some embodiments, the data voltage (Vdata) may not be supplied through the data lines DL of the pixel PX during the second refresh section Pr2 or the third refresh section Pr3 of the second frame frame2 or the third frame frame 3 that are remaining, and the light emitting elements ED may emit light based on the driving current flowing by the driving transistor DT connected to each of the light emitting elements ED during the second or third refresh section Pr2 or Pr3 and the second or third horizontal holding section Ph2 or Ph3. That is, in the low speed driving mode, the display device may perform only a light emitting operation during the plurality of frames based on image data input in the first refresh section Pr1. For example, in an embodiment, in the low speed driving mode, the scan section may be maintained for 16.6 milliseconds (hereinafter, msec) among 1 second, and the emission section may be maintained for 983.4 msec among the 1 second. However, the embodiments are not limited thereto, and in some embodiment, in the low speed driving mode, the scan section may be a period corresponding to the plurality of frames. A method of driving the pixel in each section will be described later with reference to FIG. 5.

Figure 5:
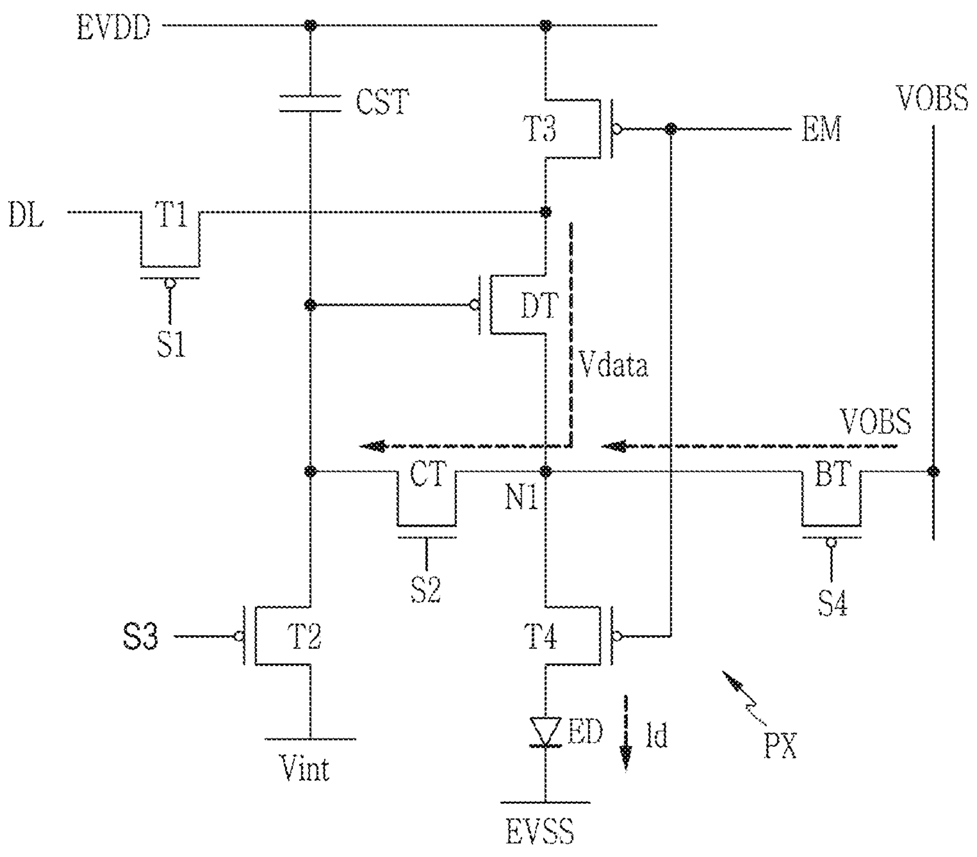
FIG. 5 is a circuit diagram of the pixel of the display device according to an embodiment.

FIG. 5 is a circuit diagram of the pixel of the display device according to an embodiment.

Referring to FIG. 5, in an embodiment, one pixel PX may include a capacitor CST, a driving transistor DT, a compensation transistor CT, a bias transistor BT, a switching transistor T1, an initialization transistor T2, an operation control transistor T3, and a light emission control transistor T4.

A gate terminal of the driving transistor DT may be connected to one end of the capacitor CST, and a first terminal (e.g., a source terminal) of the driving transistor DT may be connected to a first pixel driving voltage (EVDD) line through the operation control transistor T3. A second terminal (e.g., a drain terminal) of the driving transistor DT may be connected to a light emitting element ED through the light emission control transistor T4. The driving transistor DT may receive the data voltage Vdata according to a switching operation of the switching transistor T1, and may supply a driving current Id for driving the light emitting element ED to the light emitting element ED.

A gate terminal of the switching transistor T1 may receive a first scan signal S1, and a first terminal (e.g., a source terminal) of the switching transistor T1 may be connected to the data line DL. A second terminal (e.g., a drain terminal) of the switching transistor T1 may be connected to the first pixel driving voltage (EVDD) line through the operation control transistor T3.

A gate terminal of the compensation transistor CT may receive a second scan signal S2. The second scan signal S2 may overlap the first scan signal S1. In an embodiment, voltage levels of the second scan signal S2 and the first scan signal S1 may be opposite to each other. For example, the first scan signal S1 may be a low level, and the second scan signal S2 may be a high level. A first terminal (e.g., a source terminal) of the compensation transistor CT may be connected to the second terminal of the driving transistor DT, and may be connected to the light emitting element ED through the light emission control transistor T4. A second terminal (e.g., a drain terminal) of the compensation transistor CT may be connected to one end of the capacitor CST, a second terminal (e.g., a drain terminal) of the initialization transistor T2, and the gate terminal of the driving transistor DT.

A gate terminal of the initialization transistor T2 may receive a third scan signal S3. The third scan signal S3 may be a signal applied to a scan line preceding a scan line to which the first scan signal S1 is applied. For example, if the first scan signal S1 is applied to an nth gate line, the third scan signal S3 may be a signal applied to an (n−1)th gate line. A first terminal (e.g., a source terminal) of the initialization transistor T2 may be connected to an initialization voltage (Vint) line, and a second terminal (e.g., a drain terminal) of the initialization transistor T2 may be connected to one end of the capacitor CST, the second terminal of the compensation transistor CT, and the gate terminal of the driving transistor DT.

A gate terminal of the operation control transistor T3 may receive a light emission control signal EM, and a first terminal (e.g., a source terminal) of the operation control transistor T3 may be connected to the first pixel driving voltage (EVDD) line. A second terminal (e.g., a drain terminal) of the operation control transistor T3 may be connected to the first terminal of the driving transistor DT and the second terminal of the switching transistor T1.

A gate terminal of the light emission control transistor T4 may receive the emission control signal EM, and a first terminal (e.g., a source terminal) of the light emission control transistor T4 may be connected to the second terminal of the driving transistor DT and the first terminal of the compensation transistor CT. A second terminal (e.g., a drain terminal) of the light emission control transistor T4 may be connected to the light emitting element ED.

A gate terminal of the bias transistor BT may receive a fourth scan signal S4, and a first terminal (e.g., a source terminal) of the bias transistor BT may be connected to a bias voltage (VOBS) line. A second terminal (e.g., a drain terminal) of the bias transistor BT may be connected to the second terminal of the driving transistor DT.

Referring to FIG. 4 and FIG. 5 together, in an embodiment, in the scan section within the first refresh section Pr1, the pixel may initialize a voltage charged or remaining in the capacitor CST and the driving transistor DT, may receive the data voltage Vdata, and may compensate for a characteristic value (a threshold voltage) of the driving transistor DT. Specifically, the initialization transistor T2 may be turned on by the third scan signal S3, and may apply an initialization voltage Vint to the capacitor CST and the driving transistor DT. The switching transistor T1 may be turned on according to the first scan signal S1, and may perform a switching operation that transfers the data voltage Vdata received from the data line DL to the source terminal of the driving transistor DT. The compensation transistor CT may be turned on according to the second scan signal S2, may electrically connect the gate terminal and the source terminal of the driving transistor DT, and a gate-source voltage (Vgs) of the driving transistor DT may increase to a difference voltage between the data voltage Vdata and the threshold voltage (Vth) of the driving transistor DT. Accordingly, the threshold voltage (Vth) of the driving transistor DT may be compensated. In a plurality of emission sections, the operation control transistor T3 and the light emission control transistor T4 may be simultaneously turned on according to the light emission control signal EM, and the driving current Id due to the first pixel driving voltage EVDD may flow to the light emitting element ED. In the emission section, light emitting elements ED may repeat light emitting and non-light emitting.

On the other hand, the threshold voltage Vth of the driving transistor DT in the first frame frame 1 including the scanning section may be different from the threshold voltage Vth of the driving transistor DT in frames frame 2 and frame 3 including only the emission section. For example, because the data voltage Vdata is applied to the driving transistor DT in the scan section, the threshold voltage Vth of the driving transistor DT in the first frame frame 1 including the scanning section and the threshold voltage Vth of the driving transistor DT in the frames frame 2 and frame 3 including only the emission section may be different. Referring to FIG. 4 and FIG. 5 together, in the first frame frame 1 including the first refresh section Pr1, the threshold voltage Vth of the driving transistor DT may increase to a threshold voltage Vth1 with a first level, or may decrease to a threshold voltage-Vth1 with a second level. Therefore, an average level of the threshold voltage Vth in the first frame frame 1 may be a first average level. The threshold voltage Vth of the driving transistor DT in the frames frame 2 and frame 3 including the refresh sections Pr2 and Pr3 that perform only a light emitting operation may increase to a threshold voltage Vth2 with a third level, or may decrease to a threshold voltage −Vth2 with a fourth level. Therefore, an average level of the threshold voltage Vth in the frames frame 2 and frame 3 may be a second average level that is different from the first average level. A difference between the threshold voltage Vth of the driving transistor DT in the first frame frame 1 and the threshold voltage Vth of the driving transistor DT in the remaining frames frame 2 and frame 3 may cause a difference in luminance of the pixel emitting light by the same voltage Vdata. This operation may be referred to as a hysteresis characteristic of the driving transistor DT. Unlike a high speed driving mode in which the scan section is repeated every frame, a data update cycle (or a data update period) that is a cycle in which the scan section is inserted may become longer, so that a difference in luminance of the light emitting element ED between frames further increases.

In an embodiment, in order to minimize the difference in luminance of the light emitting element ED described above, the bias voltage VOBS may be applied to the second terminal (i.e., a first node N1) of the driving transistor DT through the bias transistor BT. Specifically, the bias transistor BT may be turned on according to the fourth scan signal S4, and the bias voltage VOBS may be applied to the second terminal of the driving transistor DT. In order to suppress a change in the threshold voltage Vth of the driving transistor DT, the bias transistor BT may apply the bias voltage VOBS to the second terminal (i.e., the first node N1) of the driving transistor DT through the bias transistor BT. For example, an operation of applying the bias voltage VOBS to the first node N1 may be performed in each frame. Referring to FIG. 4 and FIG. 5 together, the operation of applying the bias voltage VOBS to the first node N1 may be performed around the refresh section Pr1, Pr2, or Pr3 of each frame. However, the embodiments are not limited thereto. By applying the bias voltage VOBS to the first node N1 in each frame, the average level of the threshold voltage Vth of the driving transistor DT in all frames frame 1, frame 2, and frame 3 may be substantially the same. The hysteresis characteristic of the driving transistor DT may be alleviated by applying the bias voltage VOBS to the second terminal (i.e., the first node N1) of the driving transistor DT.

The bias voltage VOBS may be provided from the bias voltage (VOBS) generator 190 (see, e.g., FIG. 2). Hereinafter, a bias voltage generator according to a comparative example will be described with reference to FIG. 6.

Figure 6:
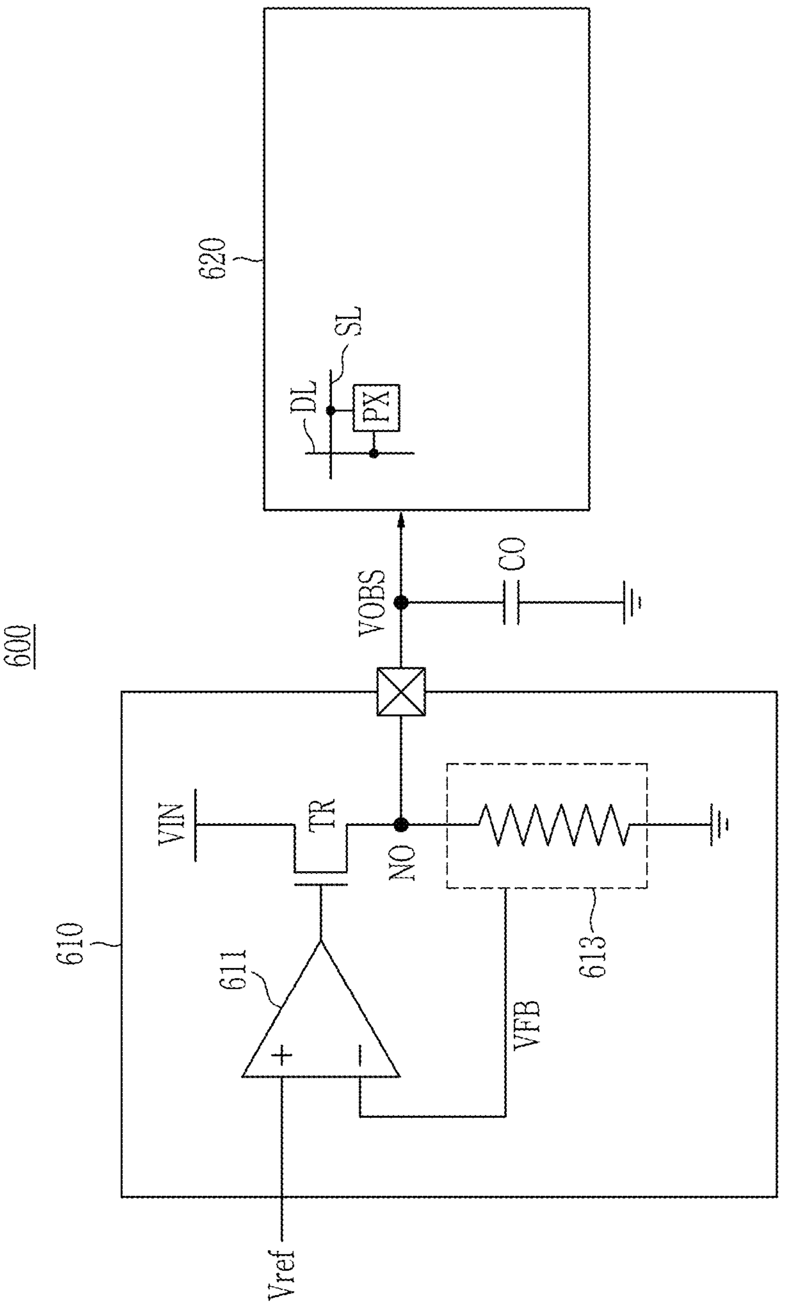
FIG. 6 is a view showing a display device including a bias voltage generator according to a comparative example.

FIG. 6 is a view showing a display device including the bias voltage generator according to the comparative example. Specifically, the display device 600 according to the comparative example may include a bias voltage generator 610 and a display panel 620. The bias voltage generator 610 according to the comparative example may be implemented as a voltage regulator. For example, the bias voltage generator 610 may be implemented as a low drop-out (LDO) regulator. The bias voltage generator 610 may receive a reference voltage Vref from the power supply 180 of FIG. 2, an external power management circuit, or the like, and may generate the bias voltage VOBS as an output voltage corresponding to the received reference voltage Vref. In an embodiment, the reference voltage Vref may be a DC voltage with a specific level.

Referring to FIG. 6, the bias voltage generator 610 may include a pass transistor TR connected between a voltage VIN and an output node NO, a voltage divider 613 connected to the output node NO and dividing a bias voltage VOBS to generate a feedback voltage VFB, and an amplifier 611 that compares the feedback voltage VFB with the reference voltage Vref to output a comparison signal and controls the pass transistor TR based on the comparison signal. The pass transistor TR of the bias voltage generator 610 may include a gate that receives the output signal of the amplifier 611, a first terminal connected to a voltage (VIN) line, and a second terminal connected to the output node NO. In an embodiment, the pass transistor TR may be implemented as an N-type transistor, but the embodiments are not limited thereto. If the feedback voltage VFB is lower than the reference voltage Vref, the bias voltage generator 610 may turn on the pass transistor TR to increase the bias voltage VOBS, and if the feedback voltage VFB is higher than the reference voltage Vref, the bias voltage generator 610 may turn off the pass transistor TR to decrease the bias voltage VOBS. Thus, the bias voltage VOBS with a specific voltage level may be generated. A voltage level of the reference voltage Vref provided to the bias voltage generator 610 according to the comparative example and a resistance value of the voltage divider 613 may be fixed values. Therefore, the bias voltage VOBS output from the bias voltage generator 610 according to the comparative example may be constant.

However, as a driving condition of the display device 600 changes, various problems may occur. For example, as the driving condition of the display device 600 changes, a resolution and a maximum luminance value thereof may increase. Accordingly, an unpredicted image quality problem (e.g., luminance deviation or the like) due to the hysteresis characteristic of the driving transistor DT may continuously occur. Therefore, it is advantage for the bias voltage VOBS for controlling the hysteresis characteristic of the driving transistor DT to be changed as a driving condition of a pixel changes. In other words, it is advantageous for a driving voltage of the pixel to change and control the bias voltage VOBS in response to the change.

Figure 7:
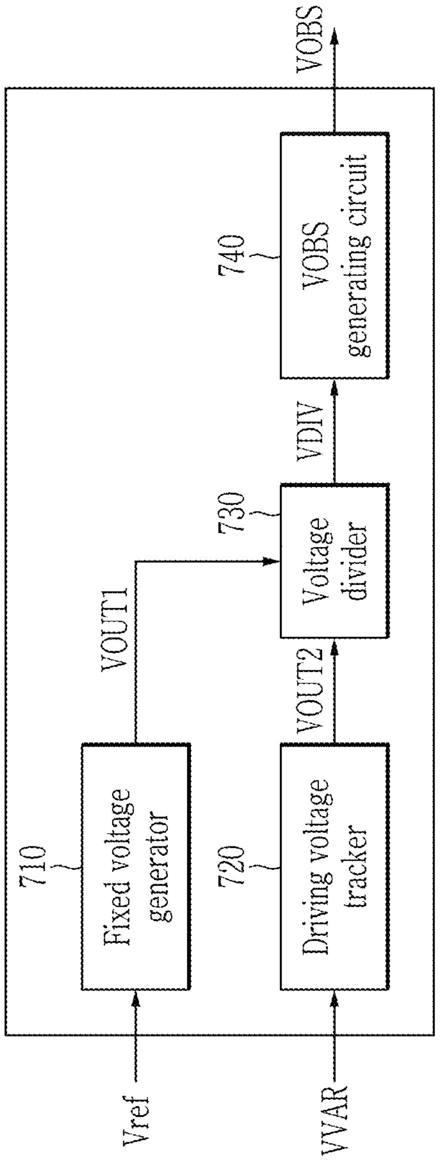
FIG. 7 is a block diagram of a bias voltage generator according to an embodiment.

FIG. 7 is a block diagram of the bias voltage generator according to an embodiment.

In an embodiment, a bias voltage generator 700 may include a fixed voltage generator 710, a driving voltage tracker 720, a voltage divider 730, and a bias voltage (VOBS) generating circuit 740. In an embodiment, the bias voltage generator 700 may correspond to the VOBS generator 190 described above. In an embodiment, the fixed voltage generator 710, the driving voltage tracker 720, and the bias voltage (VOBS) generating circuit 740 may be implemented as a voltage regulator. For example, the fixed voltage generator 710, the driving voltage tracker 720, and the bias voltage (VOBS) generating circuit 740 may be implemented as a low voltage drop-out regulator to detect (or sense) a change in each output voltage and compensate for the detected change.

In an embodiment, the fixed voltage generator 710 may receive a reference voltage Vref from the power supply 180 of FIG. 2, an external power management circuit, or the like. In an embodiment, the reference voltage Vref may be a DC voltage with a specific level. The fixed voltage generator 710 may output a first output voltage VOUT1 corresponding to the reference voltage Vref based on the reference voltage Vref.

In an embodiment, the driving voltage tracker 720 may receive an input voltage VVAR that changes depending on a change in the first pixel driving voltage EVDD. For example, in an embodiment, the input voltage VVAR may be the maximum gamma voltage VG_TOP that varies depending on the first pixel driving voltage EVDD. However, the embodiments are not limited thereto, and in some embodiments, the input voltage VVAR may be any voltage that changes depending on the first pixel driving voltage EVDD. In an embodiment, the input voltage VVAR may be the first pixel driving voltage EVDD. In an embodiment, the input voltage VVAR may be the second pixel driving voltage EVSS. The driving voltage tracker 720 may output a second output voltage VOUT2 corresponding to the input voltage VVAR based on the input voltage VVAR.

In an embodiment, the voltage divider 730 may receive the first output voltage VOUT1 and the second output voltage VOUT2. The voltage divider 730 may include a resistor ladder connected between the first output voltage VOUT1 and the second output voltage VOUT2. The voltage divider 730 may divide the first output voltage VOUT1 and the second output voltage VOUT2 according to a resistance ratio to output a divided voltage VDIV.

In an embodiment, the bias voltage (VOBS) generating circuit 740 may receive the divided voltage VDIV. The bias voltage (VOBS) generating circuit 740 may generate the bias voltage VOBS corresponding to the divided voltage VDIV based on the divided voltage VDIV. In an embodiment, the bias voltage (VOBS) generating circuit 740 may shift a voltage level of the bias voltage VOBS. Based on a voltage divider within the bias voltage (VOBS) generating circuit 740, a voltage level of the bias voltage VOBS may be adjusted.

The bias voltage generator 700 may generate the bias voltage VOBS that varies depending on a change in the first pixel driving voltage EVDD. The bias voltage generator 700 may adjust the voltage level of the bias voltage VOBS.

Figure 8:
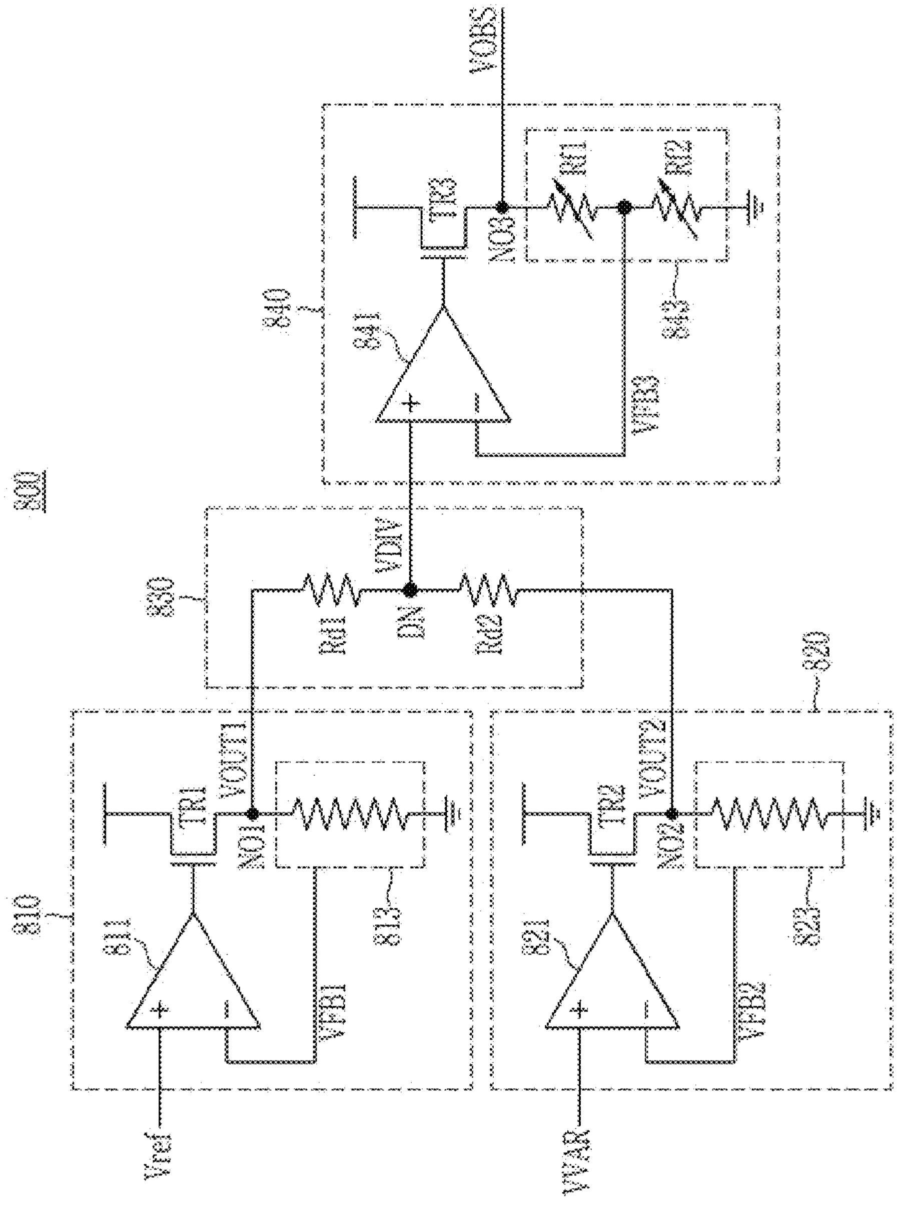
FIG. 8 is a circuit diagram of the bias voltage generator according to an embodiment.

FIG. 8 is a circuit diagram of the bias voltage generator according to an embodiment.

In an embodiment, a bias voltage generator 800 may include a fixed voltage generator 810, a driving voltage tracker 820, a voltage divider 830, and a bias voltage (VOBS) generating circuit 840. In an embodiment, the bias voltage generator 700 may correspond to the VOBS generator 190 described above. In an embodiment, the fixed voltage generator 810, the driving voltage tracker 820, the voltage divider 830, and the bias voltage (VOBS) generating circuit 840 may correspond respectively to the fixed voltage generator 710, the driving voltage tracker 720, the voltage divider 730 and the VOBS generating circuit 740 of FIG. 7. In an embodiment, the fixed voltage generator 810, the driving voltage tracker 820, and the bias voltage (VOBS) generating circuit 840 may be implemented as a voltage regulator. For example, the fixed voltage generator 810, the driving voltage tracker 820, and the bias voltage (VOBS) generating circuit 840 may be implemented as a low voltage drop-out regulator. In FIGS. 8 to 11, an example of a configuration of the fixed voltage generator 810, the driving voltage tracker 820, the voltage divider 830, and the bias voltage (VOBS) generating circuit 840 is illustrated, but the configuration of the fixed voltage generator 810, the driving voltage tracker 820, the voltage divider 830, and the bias voltage (VOBS) generating circuit 840 according to various embodiments are not limited thereto.

In an embodiment, the fixed voltage generator 810 may include a first voltage divider 813 that is connected to a first output node NO1 and divides the first output voltage VOUT1 to generate a first feedback voltage VFB1, a first amplifier 811 that compares the first feedback voltage VFB1 with the reference voltage Vref to control a first pass transistor TR1, and the first pass transistor TR1 that generates the first output voltage VOUT1 with a specific voltage level based on an output of the first amplifier 811.

In an embodiment, the driving voltage tracker 820 may include a second voltage divider 823 that is connected to a second output node NO2 and divides the second output voltage VOUT2 to generate a second feedback voltage VFB2, a second amplifier 821 that compares the second feedback voltage VFB2 with the input voltage VVAR to control a second pass transistor TR2, and the second pass transistor TR2 that generates the second output voltage VOUT2 based on an output of the second amplifier 821. In an embodiment, the input voltage VVAR may be the first pixel driving voltage EVDD. In an embodiment, the input voltage VVAR may be a second pixel driving voltage EVSS. In an embodiment, the input voltage VVAR may be the maximum gamma voltage VG_TOP that is a voltage that varies depending on the first pixel driving voltage EVDD. However, the embodiments are not limited thereto.

In an embodiment, the voltage divider 830 may include a resistor ladder. One side of the resistor ladder may receive the first output voltage VOUT1 from the fixed voltage generator 810, and the other side of the resistor ladder may receive the second output voltage VOUT2 from the driving voltage tracker 820. In an embodiment, the voltage divider 830 is shown as including a first resistor Rd1 and a second resistor Rd2, but the embodiments are not limited thereto, and in some embodiments, the voltage divider 830 may include a plurality of resistors connected in series between a node receiving the first output voltage VOUT1 and a node receiving the second output voltage VOUT2. The voltage divider 830 may divide the first output voltage VOUT1 and the second output voltage VOUT2 according to a resistance ratio of the plurality of resistors within the voltage divider 830 to output the divided voltage VDIV. The voltage divider 830 may transfer a value in which a change value of the first pixel driving voltage EVDD is reflected in the first output voltage VOUT1 that is the divided voltage VDIV to the bias voltage (VOBS) generating circuit 840.

In an embodiment, the bias voltage (VOBS) generating circuit 840 may receive the divided voltage VDIV, and may output the bias voltage VOBS based on a result of a comparison between a third feedback voltage VFB3 and the divided voltage VDIV. The bias voltage (VOBS) generating circuit 840 may include a third voltage divider 843 that is connected to a third output node NO3 and divides the bias voltage VOBS to generate the third feedback voltage VFB3, a third amplifier 841 that compares the third feedback voltage VFB3 with the divided voltage VDIV to control a third pass transistor TR3, and the third pass transistor TR3 that generates the bias voltage VOBS based on an output of the third amplifier 841. In an embodiment, the third voltage divider 841 may include a plurality of resistors Rf1 and Rf2 connected in series. The plurality of resistors Rf1 and Rf2 may be variable resistors. That is, the bias voltage (VOBS) generating circuit 840 may adjust a ratio of resistance by changing the plurality of resistors Rf1 and Rf2 within the third voltage divider 843 to adjust a voltage level of the bias voltage.

Figure 9:
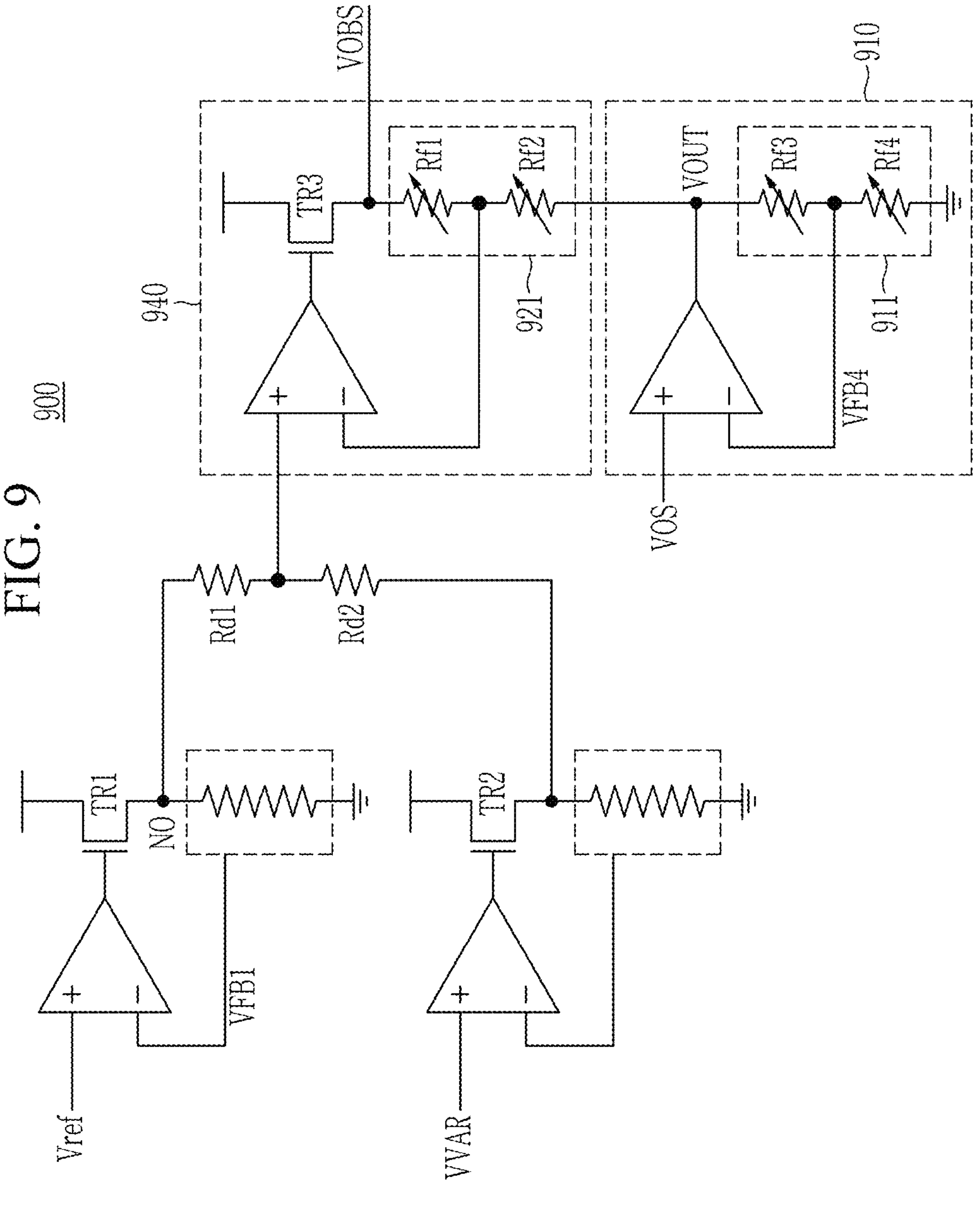
FIG. 9 is a circuit diagram of the bias voltage generator according to an embodiment.

FIG. 9 is a circuit diagram of the bias voltage generator according to an embodiment.

In an embodiment, a bias voltage generator 900 may correspond to the VOBS generator 190 described above. In an embodiment, the bias voltage generator 900 may include components corresponding to the fixed voltage generator 810, the driving voltage tracker 820, and the voltage divider 830, and a bias voltage (VOBS) generating circuit 940, and may further include a voltage level converter 910. The VOBS generating circuit 940 may correspond to the VOBS generating circuit 840 described above. The voltage level converter 910 may be implemented as a voltage regulator. For example, the voltage level converter 910 may be implemented as a low voltage drop-out regulator. In an embodiment, the voltage level converter 910 may receive an offset voltage VOS. In an embodiment, the voltage level converter 910 may receive the offset voltage VOS from the power supply 180 of FIG. 2, an external power management circuit, or the like. The voltage level converter 910 may output an output voltage VOUT based on a result of a comparison between a fourth feedback voltage VFB4 and the offset voltage VOS.

In an embodiment, the voltage level converter 910 may include a fourth voltage divider 911. The fourth voltage divider 911 may include a plurality of resistors Rf3 and Rf4 connected in series. The plurality of resistors Rf3 and Rf4 may be variable resistors. That is, by changing the plurality of resistances Rf3 and Rf4, a voltage level of the output voltage VOUT may be adjusted. That is, the voltage level converter 910 may adjust a ratio of resistance by changing the plurality of resistors Rf3 and Rf4 within the fourth voltage divider 911 to adjust the voltage level of the output voltage VOUT.

In an embodiment, a voltage level of the bias voltage VOBS may be shifted based on the output voltage VOUT. For example, if a ratio of resistance within the voltage divider 911 included in the voltage level converter 910 that is a ratio of the third feedback voltage Rf3 to the fourth feedback voltage Rf4 is M and a ratio of resistance within a voltage divider 921 included in the bias voltage (VOBS) generating circuit 920 that is a ratio of the first feedback voltage Rf1 to the second feedback voltage Rf2 is N, the bias voltage VOBS may be as follows.

$$VOBS=(1+N)*VDIV-N*(1+M)*VOS \qquad \text{(Equation 1)}$$

That is, the voltage level converter 910 may optimize a range of the voltage level of the bias voltage VOBS by changing the range of the voltage level of the bias voltage VOBS. In an embodiment, the voltage level converter 910 may adjust a range in which the voltage level of the bias voltage VOBS is changed by changing resistance values of the plurality of resistors Rf3 and Rf4 within the voltage divider 911.

Figure 10:
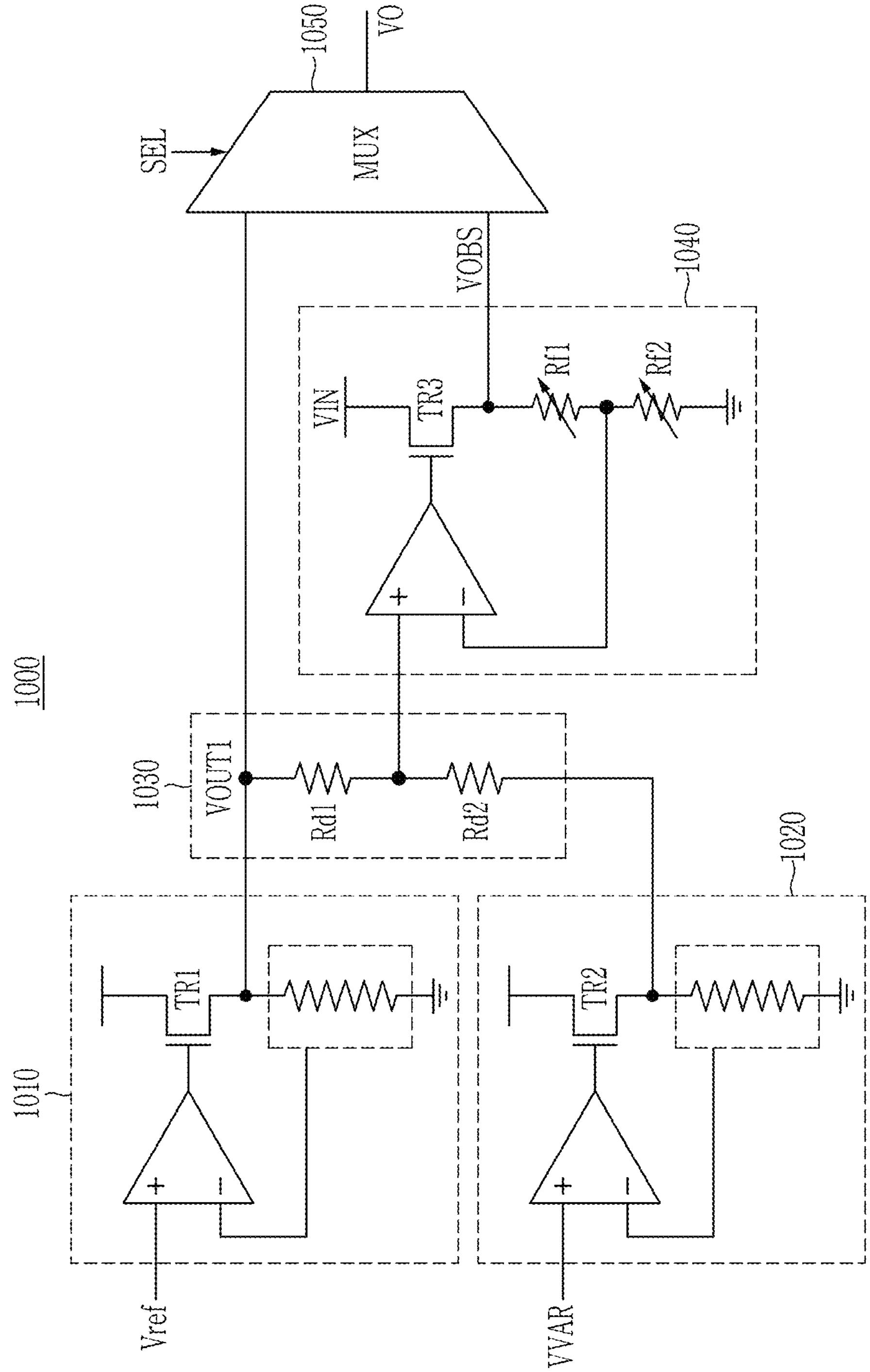
FIG. 10 is a circuit diagram of the bias voltage generator according to an embodiment.

FIG. 10 is a circuit diagram of the bias voltage generator according to an embodiment. In an embodiment, a bias voltage generator 1000 may further include a multiplexer 1050.

In an embodiment, the bias voltage generator 1000 may include a fixed voltage generator 1010, a driving voltage tracker 1020, a voltage divider 1030, and a bias voltage (VOBS) generating portion 1040. In an embodiment, the bias voltage generator 1000 may correspond to the VOBS generator 190 described above. In an embodiment, the fixed voltage generator 1010, the driving voltage tracker 1020, the voltage divider 1030, and the VOBS generating portion 1040 may correspond respectively to the fixed voltage generator 810, the driving voltage tracker 820, the voltage divider 830, and the bias voltage (VOBS) generating circuit 840. In some embodiments, the bias voltage generator 1000 may further include the voltage level converter 910 of FIG. 9.

In the embodiment illustrated in FIG. 10, the bias voltage generator 1000 may further include the multiplexer 1050. The multiplexer 1050 may receive the first output voltage VOUT1 and the bias voltage VOBS, and may output an output voltage VO based on a control signal SEL. The multiplexer 1050 may selectively output the first output voltage VOUT1 or the bias voltage VOBS based on the timing controller 110 of FIG. 2 or the control signal SEL provided from the outside. Specifically, if a driving mode of the display device 100 of FIG. 2 is changed (for example, if the driving mode is changed from the high speed driving mode to the low speed driving mode), a luminance difference between the frames due to the hysteresis characteristic of the driving transistor DT may further increase in the low speed driving mode. Thus, in the event of a change to the low speed driving mode, it is advantageous to change the bias voltage VOBS to minimize an image quality problem that occurs as a driving condition of a pixel changes, as described above. Accordingly, the bias voltage generator 1000 may use the multiplexer 1050 to selectively output the first output voltage VOUT1 as the output voltage VO in the high speed driving mode and selectively output the bias voltage VOBS as the output voltage VO in the low speed driving mode.

Figure 11:
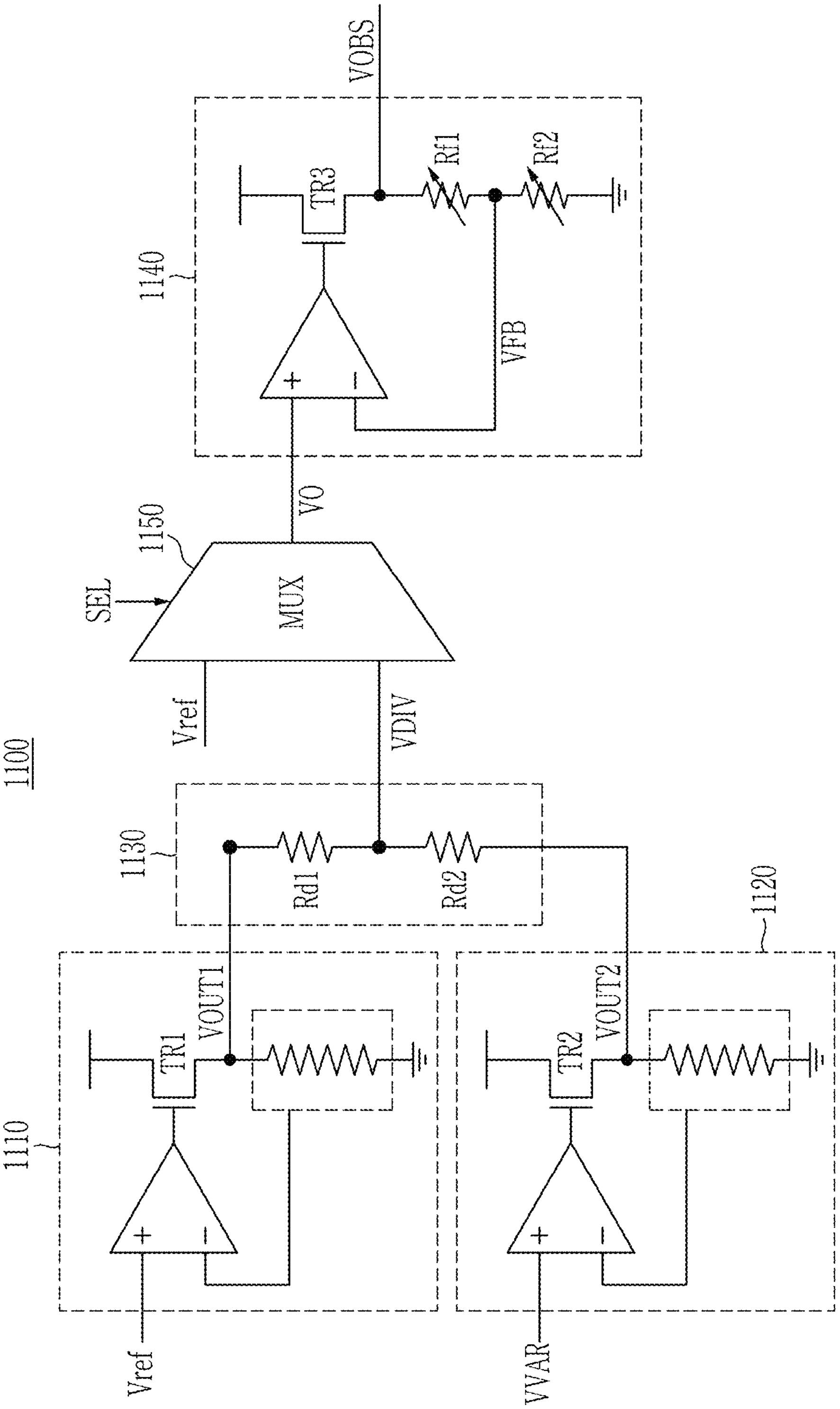
FIG. 11 is a circuit diagram of the bias voltage generator according to an additional embodiment.

FIG. 11 is a circuit diagram of the bias voltage generator according to an embodiment. Specifically, FIG. 11 represents the bias voltage generator in which a position of the multiplexer 1050 of FIG. 10 is changed.

In an embodiment, the bias voltage generator 1100 may include a fixed voltage generator 1110, a driving voltage tracker 1120, a voltage divider 1130, and a bias voltage (VOBS) generating portion 1140. In an embodiment, the bias voltage generator 1100 may correspond to the VOBS generator 190 described above. In an embodiment, the fixed voltage generator 1110, the driving voltage tracker 1120, the voltage divider 1130, and the VOBS generating portion 1140 may correspond respectively to the fixed voltage generator 810, the driving voltage tracker 820, the voltage divider 830, and the bias voltage (VOBS) generating circuit 840. The bias voltage generator 1100 according to the embodiment illustrated in FIG. 11 may further include a multiplexer 1150 connected between the voltage divider 1130 and the bias voltage (VOBS) generating portion 1140.

In an embodiment, the multiplexer 1150 may receive a reference voltage Vref and the divided voltage VDIV. In an embodiment, the reference voltage Vref may be the same voltage as the reference voltage Vref input to the fixed voltage generator 1110. The multiplexer 1150 may selectively output the reference voltage Vref or the divided voltage VDIV as an output voltage VO based on a control signal SEL.

In an embodiment, if the multiplexer 1150 outputs the reference voltage Vref as the output voltage VO, the bias voltage (VOBS) generating portion 1140 may output the bias voltage VOBS with a specific voltage level based on a result of a comparison between the reference voltage Vref and the feedback voltage VFB. The bias voltage (VOBS) generating portion 1140 may adjust a voltage level of the bias voltage VOBS by changing resistance values of a plurality of resistors Rf1 and Rf2 within the bias voltage (VOBS) generating portion 1140. In an embodiment, if the multiplexer 1150 outputs the divided voltage VDIV as the output voltage VO, the bias voltage (VOBS) generating portion 1140 may output the bias voltage VOBS with a specific voltage level based on a result of a comparison between the divided voltage VDIV and the feedback voltage VFB. In an embodiment, the divided voltage VDIV may be a value in which a change value of the first pixel driving voltage EVDD is reflected in the first output voltage VOUT1 generated in the fixed voltage generator 1110. The bias voltage (VOBS) generating portion 1140 may adjust the voltage level of the bias voltage VOBS by changing the resistance values of the plurality of resistors Rf1 and Rf2 within the bias voltage (VOBS) generating portion 1140.

Figure 12:
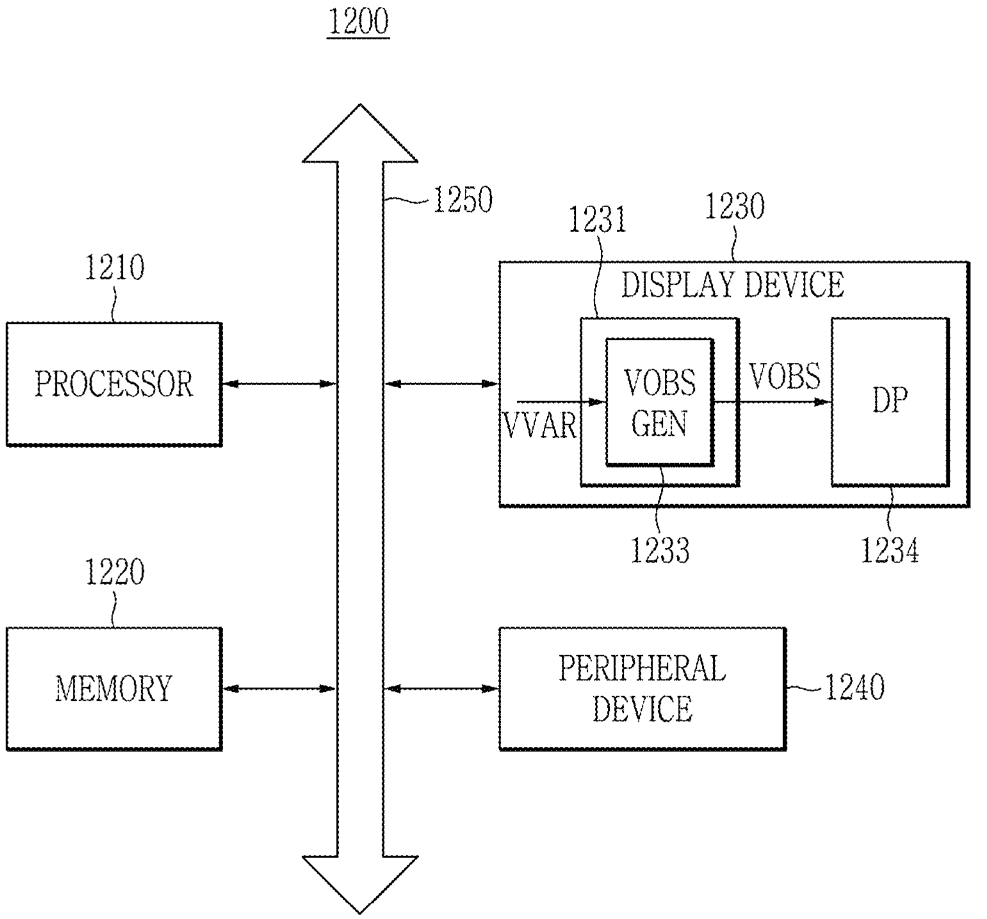
FIG. 12 is a view for describing a display system according to an embodiment.

FIG. 12 is a view for describing a display system according to an embodiment.

Referring to FIG. 12, in an embodiment, a display system 1200 may include a processor 1210, a memory 1220, a display device 1230, and a peripheral device 1240 that are electrically connected to a system bus 1250.

The processor 1210 may control input/output of data of the memory 1220, the display device 1230, and the peripheral device 1240, and may perform image processing of image data transmitted between the devices.

The memory 1220 may include a volatile memory such as a dynamic random access memory (DRAM) and/or a non-volatile memory such as a flash memory. The memory 1220 may include the DRAM, a phase-change random access memory (PRAM), a magnetic random access memory (MRAM), a resistive random access memory (ReRAM), a ferroelectric random access memory (FRAM), a NOR flash memory, a NAND flash memory, a fusion flash memory (e.g., a memory that combines a static random access memory (SRAM) buffer, a NAND flash memory, and a NOR interface logic), and the like. The memory 1220 may store image data obtained from the peripheral device 1240, or may store an image signal processed by the processor 1210.

The display device 1230 may include a driving circuit 1231 and a display panel 1234, and the driving circuit 1231 may display image data applied through the system bus 1250 on the display panel 1234. The driving circuit 1231 may include a bias voltage (VOBS) generator 1233. In an embodiment, the bias voltage (VOBS) generator 1233 may receive an input voltage VVAR, and may output a bias voltage VOBS corresponding to the input voltage VVAR. The input voltage VVAR may be a voltage that changes in response to a change in a driving voltage that drives a pixel of the display panel 1234. For example, the input voltage VVAR may be a maximum gamma voltage. The bias voltage generator 1233 may output the bias voltage VOBS that changes in response to the change in the driving voltage that drives the pixel of the display panel 1234. The bias voltage (VOBS) generator 1233 may be the bias voltage generator described with reference to FIGS. 7 to 11.

The peripheral device 1240 may be a device that converts a moving image, a still image, or the like of a camera, a scanner, a webcam, or the like to an electrical signal. Image data acquired through the peripheral device 1240 may be stored in the memory 1220, or may be displayed on the panel 1234 in real-time.

The display system 1200 may be provided in a mobile electronic product such as a smartphone, but the embodiments are not limited thereto, and in some embodiments, the display system 1200 may be provided in various types of electronic products that display images.

In an embodiment, each component or a combination of two or more components described with reference to FIGS. 1 to 12 may be implemented as a digital circuit, a programmable or non-programmable logic device or array, an application specific integrated circuit (ASIC), or the like.

While various embodiments have been described with reference to the drawings, it is to be understood that the disclosure is not limited to the various embodiments, but, on the contrary, is intended to cover various modifications and equivalent arrangements included within the spirit and scope of the appended claims.

What is claimed is:

1. A display driving circuit comprising:

a data driver configured to output a data signal to a plurality of pixels; and a power supply configured to generates a driving voltage, wherein the power supply comprises a bias voltage generator configured to receive a reference voltage and a feedback voltage corresponding to a change in the driving voltage, and to generate a bias voltage based on the reference voltage and the feedback voltage, wherein the driving voltage is provided to a first end of a transistor that generates a driving current based on the data signal provided to each of the plurality of pixels, and wherein the bias voltage is provided at a second end of the transistor.

2. The display driving circuit of claim 1, the bias voltage generator including:

a first voltage regulator configured to generate a first output voltage corresponding to the reference voltage;

a second voltage regulator configured to receive a first input voltage that varies according to the change in the driving voltage and generate a second output voltage corresponding to the first input voltage; and a third voltage regulator configured to output the bias voltage corresponding to a divided voltage generated based on the first output voltage and the second output voltage.

3. The display driving circuit of claim 2, wherein the first voltage regulator includes:

a first voltage divider configured to generate a first feedback voltage corresponding to the first output voltage;

a first amplifier configured to compare the first feedback voltage and the reference voltage and output a first comparison signal corresponding to a comparison result from the first amplifier; and a first transistor configured to generate the first output voltage based on the first comparison signal, wherein the second voltage regulator includes:

a second voltage divider configured to generate a second feedback voltage corresponding to the second output voltage;

a second amplifier configured to compare the second feedback voltage and the first input voltage and output a second comparison signal corresponding to a comparison result from the second amplifier; and a second transistor configured to generate the second output voltage based on the second comparison signal, and wherein the third voltage regulator includes:

a third voltage divider configured to generate a third feedback voltage corresponding to the bias voltage;

a third amplifier configured to compare the third feedback voltage and the divided voltage and output a third comparison signal corresponding to a comparison result from the third amplifier; and a third transistor configured to generate the bias voltage based on the third comparison signal.

4. The display driving circuit of claim 3, wherein the third voltage divider includes a plurality of variable resistors connected in series between a ground voltage and an output node that outputs the bias voltage.

5. The display driving circuit of claim 2, wherein the first voltage regulator, the second voltage regulator, and the third voltage regulator are low drop-out (LDO) regulators.

6. The display driving circuit of claim 2, further comprising a fourth voltage regulator configured to receive a second input voltage and output a third output voltage that shifts a range of a voltage level of the bias voltage based on the second input voltage.

7. The display driving circuit of claim 6, wherein the fourth voltage regulator includes:

a fourth voltage divider configured to generate a fourth feedback voltage corresponding to the third output voltage; and a fourth amplifier configured to compare the fourth feedback voltage and the second input voltage and output a fourth comparison signal as the third output voltage.

8. The display driving circuit of claim 7, wherein the fourth voltage divider includes a plurality of variable resistors connected in series between a ground voltage and an output node that outputs the third output voltage.

9. The display driving circuit of claim 6, wherein the fourth voltage regulator is a low drop-out regulator.

10. The display driving circuit of claim 2, wherein the first input voltage is a maximum gamma voltage that generates a plurality of gamma voltages that determine a luminance of the plurality of pixels.

11. The display driving circuit of claim 2, wherein the bias voltage generator further comprises a multiplexer configured to receive the first output voltage and the bias voltage and selectively output the first output voltage or the bias voltage based on a control signal.

12. A display device comprising:

a display panel that includes a plurality of pixels, each pixel including a light emitting element, a first transistor providing a driving current to the light emitting element based on a driving voltage applied to a first end thereof and a data voltage applied to a gate thereof, and a second transistor providing a bias voltage to a second end of the first transistor, the bias voltage varying a threshold voltage of the first transistor;

a timing controller configured to output a control signal to the display panel to display an image at a first frame frequency and a second frame frequency; and a bias voltage generator configured to receive a reference voltage and a feedback voltage corresponding to a change in the driving voltage, and to generate the bias voltage based on the reference voltage and the feedback voltage.

13. A display driving circuit comprising:

a timing controller configured to that output a control signal indicating a driving mode of a display panel including a plurality of pixels; and a bias voltage generator configured to output a bias voltage that controls a luminance deviation between frames of the plurality of pixels, wherein the bias voltage generator senses a change in a driving voltage of the plurality of pixels, receives a reference voltage independent of the driving voltage, and a first voltage varying according to the change in the driving voltage, generates a first output voltage with a specific level based on the reference voltage, generates a second output voltage based on the reference voltage and the first voltage, and outputs the first output voltage as the bias voltage when the control signal indicates a high frequency driving mode and outputs the second output voltage as the bias voltage when the control signal indicates a low frequency driving mode.

14. The display driving circuit of claim 13, wherein the bias voltage generator comprises:

a first voltage regulator configured to generate a third output voltage based on the reference voltage;

a second voltage regulator configured to generate a fourth output voltage based on the first voltage;

a multiplexer configured to receive a divided voltage generated based on the third output voltage and the fourth output voltage and the reference voltage and output the reference voltage or the divided voltage according to the control signal; and a third voltage regulator configured to receive the reference voltage or the divided voltage from the multiplexer and output the bias voltage based on the received voltage.

15. The display device of claim 12, wherein the bias voltage generator provides the bias voltage with a constant voltage level based on a first control signal indicating the first frame frequency received from the timing controller, and provides the bias voltage with a voltage level varying based on the change in the driving voltage based on a second control signal indicating the second frame frequency received from the timing controller.

16. The display device of claim 15, wherein the bias voltage generator comprises:

a first voltage regulator configured to generate a first output voltage corresponding to the reference voltage;

a second voltage regulator configured to generate a second output voltage corresponding to a first voltage;

a third voltage regulator configured to receive a divided voltage generated based on the first output voltage and the second output voltage and generate a third output voltage corresponding to the divided voltage; and a multiplexer configured to receive the first output voltage and the third output voltage, output the first output voltage based on the first control signal, and output the third output voltage based on the second control signal.

17. The display device of claim 16, further comprising a fourth voltage regulator configured to receive a second voltage and generate a fourth output voltage that corresponds to the second voltage and shifts a range of a voltage level of the third output voltage.

18. The display device of claim 16, wherein the first voltage is the driving voltage.

19. The display device of claim 16, wherein the first voltage is a maximum gamma voltage that generates a plurality of gamma voltages.

20. The display device of claim 12, wherein the first frame frequency is a high speed driving frequency, and the second frame frequency is a low speed driving frequency.

* * * * *